United States Patent [19]

Baumber

[11] Patent Number: 4,578,895

[45] Date of Patent: Apr. 1, 1986

[54] HERBICIDAL APPLICATOR

[76] Inventor: Donald E. Baumber, 46 Greenacre Rd., South Hurstville, New South Wales, 2221, Australia

[21] Appl. No.: 649,965

[22] Filed: Sep. 12, 1984

[30] Foreign Application Priority Data

Sept. 4, 1981 [AU] Australia .................. 87487/82

Related U.S. Application Data

[63] Continuation of Ser. No. 411,064, Aug. 24, 1982, abandoned.

[51] Int. Cl.$^4$ ............................................. A01M 21/00
[52] U.S. Cl. ................................................ 47/1.5
[58] Field of Search .................. 47/1, 1.5, 79, 81, 58; 222/394, 402.1, 424, 206, 207, 209, 211; 401/188 R, 188.1, 183, 151, 185; 141/67, 110–112, 45; 137/145, 205–207.5; D8/12, 2; 119/157

[56] References Cited

U.S. PATENT DOCUMENTS

| | | | |
|---|---|---|---|
| 234,003 | 11/1880 | Dixon | 137/145 X |
| 816,345 | 3/1906 | Lockwood | 141/45 |
| 1,307,195 | 6/1919 | Gardner | 401/151 X |
| 1,978,959 | 10/1934 | Samphere | 141/20.5 X |
| 3,040,477 | 6/1962 | June | 135/118 X |
| 3,175,736 | 3/1965 | Pelto | 222/207 |
| 3,402,860 | 9/1968 | Torongo | 222/207 |
| 3,458,265 | 7/1969 | Andrini | 401/188 |
| 3,464,629 | 9/1969 | Peters | 239/104 |
| 3,485,563 | 12/1969 | Chennell | 401/183 |
| 3,783,888 | 1/1974 | Johnson | 137/145 |
| 4,027,986 | 6/1977 | Patrick | 47/1.5 |
| 4,208,835 | 6/1980 | Roll et al. | 47/1.5 |
| 4,219,964 | 9/1981 | Dale | 47/1.5 |
| 4,278,360 | 7/1981 | Lorscheid et al. | 47/1.5 |
| 4,285,160 | 8/1981 | Barton et al. | 47/1.5 |
| 4,310,988 | 1/1982 | Porter | 47/1.5 |
| 4,324,349 | 4/1982 | Kaufman | 111/211 |
| 4,369,596 | 1/1983 | Hartford | 47/1.5 |
| 4,377,920 | 3/1983 | Bowman | 47/1.5 |

FOREIGN PATENT DOCUMENTS

| | | | |
|---|---|---|---|
| 463851 | 9/1973 | Australia | 47/1.5 |
| 62043/80 | 4/1980 | Australia | 47/1.5 |
| 1942881 | 4/1970 | Fed. Rep. of Germany | 47/1.5 |
| 832499 | 9/1938 | France | 401/185 |
| 237278 | 1/1926 | United Kingdom . | |
| 898669 | 6/1962 | United Kingdom | 47/1.5 |

Primary Examiner—James R. Feyrer
Attorney, Agent, or Firm—Ladas & Parry

[57] ABSTRACT

The present invention provides an apparatus for applying chemicals to plants comprising a reservoir containing chemical solution or liquid chemical; wick means for applying said chemical to plants to be treated by contact of the wick means with the plants; supply line connecting said reservoir with said wick means for supply of said chemical to said wick means; said supply line including a pressure chamber intermediate said reservoir and said wick means; and pressure means to force said chemical from said reservoir and into said pressure chamber thereby pressurizing said pressure chamber and contacting said wick means with said chemical; wherein on reduction of pressure from said reservoir, the pressure in said pressure chamber forces said chemical back along said supply line towards said reservoir and away from said wick means, and when pressure in said reservoir is less than ambient pressure, chemical is withdrawn from said wick means.

19 Claims, 8 Drawing Figures

HERBICIDAL APPLICATOR

This is a continuation of co-pending application Ser. No. 411,064 filed on Aug. 24, 1982, now abandoned.

BACKGROUND OF THE INVENTION

1. Field of the Invention

This invention relates to improvements in wet-rope or rope-wick applicators especially for applying herbicides to weeds, and to improved methods of applying herbicides.

The applicators of the invention can be used to apply any type of liquid or solution to growing plants. The applicators are especially suited to applying herbicides to weeds in a growing crop where the weeds are taller than the crop.

2. Description of the Prior Art

Australian Registered Designs Nos. 84 620, 84 659, 84 660, 84 661, 84 685, 84 656 and 84 687 illustrate hand-held wet-rope applicators in which a rope-wick is supplied from a tubular reservoir by gravity feed.

U.S. Pat. Nos. 4,187,638 and 4,219,964 disclose rope-wick applicators in which rope-wicks are woven through holes in cylindrical reservoirs, the wicks draw herbicide from the reservoirs by capilliary action. The cylindrical reservoirs are supported by a boom and drawn by a tractor or the like to bring the wicks into physical contact with the weeds and the herbicide or herbicide solution is wiped on to the weeds from the wick.

U.S. Pat. Nos. 1,368,123, 1,523,590, 1,764,952, 1,818,369, 2,123,988, 2,311,782, 2,458,027, 2,530,234, 2,769,668, 2,979,757, 2,946,154, 3,002,319, 3,021,642, 3,077,701, 3,184,888, 4,027,986, 4,291,491 and 4,305,224; and 910,933, 1,109,060 and 1,527,669 all disclose herbicide or liquid applicators having a reservoir which feeds liquid to a rope-wick, the liquid flowing to the wick by gravitational or capillary action; the second group are similar to the first group of patents except that instead of rope-wicks they embody an apron type of wick.

U.S. Pat. Nos. 1,507,595, 3,198,396, 3,651,600 and 4,019,278 disclose liquid applicators comprising reservoirs having supply line(s) to a cylindircal reservoir with a transverse longitudinal axis. The cylindrical reservoir has a series of holes through to the outside surface which is covered with an absorbent material. These devices operate using gravity; absorbtion and pumping action.

Further, U.S. Pat. Nos. 2,935,818 and 4,208,835 disclose liquid applicators comprising reservoirs and pumps to spray a liquid onto a revolving cylindrical applicator. The cylindrical applicator is covered with an absorbtive material which imparts the liquid to surfaces that come into contact with it.

U.S. Pat. No. 3,320,694 describes a liquid applicator having a reservoir and pump means to spray liquid onto plants.

Australian Patent Application No. 62043/80 describes another type of rope-wick applicator in which two parallel cylindrical reservoirs each supply different ends of a series of parallel rope-wicks which extend from the cylindrical reservoirs at an angle to them. The cylindrical reservoirs are supplied from a master reservoir and supported on a frame such that when drawn by a tractor or the like with the axes of the cylindrical reservoirs perpendicular to the direction of movement the rope-wicks sweep diagonally across the weeds wiping herbicide or herbicide solution on to them.

The known applicators described above all have three major disadvantages. Because of the gravity or capilliary feed, an operator using those applicators cannot vary supply of herbicide when treating an area where the density of weeds is variable other than by varying tractor speed or, in the case of hand-held applicators going over and over thicker clumps of weeds. Again, because of the gravity or capilliary feed, the prior art applicators tend to allow the herbicide to drip on to the crop or desirable plants especially when the applicators are stationary. Herbicide must be mixed by operators of the prior art applicators with the resultant dangers in handling toxic materials. Spraying methods tend to apply liquid to all plants and are thus not as selective in their use to eradicate weeds, as compared with wiping methods. Spraying methods also endanger operators or other persons, by allowing these persons to come into contact with the airborne and windborne liquids and herbicides.

SUMMARY OF THE INVENTION

The improved applicators of the present invention allow the operators to vary the supply of liquid to the wicks and reduce the tendency of the applicators to drip. Most embodiments of the present invention allow commercial packs of herbicide to be used directly without any mixing. The preferred applicators of the present invention also economise on the amount of herbicide or herbicide solution needed to fill the applicators to a sufficient degree for the applicators to function.

The applicators of the present invention are not necessarily restricted to rope-wicks. Other wicks such as cloth or sponge (natural or synthetic) or fibres or brushes can also be employed with the improved applicators of the present invention. In the context of this invention, the term "wick" means any material capable of absorbing a liquid by capilliary action and also capable of applying the liquid so absorbed to the foliage of plants by wiping the wick against the foliage.

In a first embodiment, the present invention provides an apparatus for applying chemicals to plants comprising a reservoir containing chemical solution or liquid chemical; wick means for applying said chemical to plants to be treated by contact of the wick means with the plants; supply line connecting said reservoir with said wick means for supply of said chemical to said wick means; said supply line including a pressure chamber intermediate said reservoir and said wick means; and pressure means to force said chemical from said reservoir and into said pressure chamber thereby pressurising said pressure chamber and contacting said wick means with said chemical; wherein on reduction of pressure from said reservoir, the pressure in said pressure chamber forces said chemical back along said supply line towards said reservoir and away from said wick means, and when pressure in said reservoir is less than ambient pressure, chemical is withdrawn from said wick means.

A second embodiment of the invention provides an apparatus for applying chemical to plants comprising: a reservoir containing chemical solution or liquid chemical; wick means for applying said chemical to plants to be treated by contact of the wick means with the plants; supply line connecting said reservoir with said wick means for supply of said chemical to said wick means; said supply line including a pressure chamber intermediate said reservoir and said wick means; pressure sensing means associated with said pressure chamber to sense the pressure therein; pressure means to force said chemical from said reservoir and into said pressure chamber thereby pressurising said pressure chamber and contacting said wick means with said chemical; control means associated with said pressure means and with said pressure sensing means adapted to maintain the pressure in said pressure chamber between predetermined limits whilst said apparatus is in operation and to reduce pressure from said reservoir on cessation of operation such that the pressure in said pressure chamber forces said chemicals back along said supply line towards said reservoir and away from said wick means and when pressure in said reservoir is less than ambient pressure, chemical is withdrawn from said wick means.

The invention also provides methods of applying herbicides to weeds by employing the applicators of the invention described herein.

BRIEF DESCRIPTION OF THE DRAWINGS

Preferred embodiments of the present invention are illustrated in the accompanying drawings in which.

DESCRIPTION OF THE PREFERRED EMBODIMENTS

Figure 1:
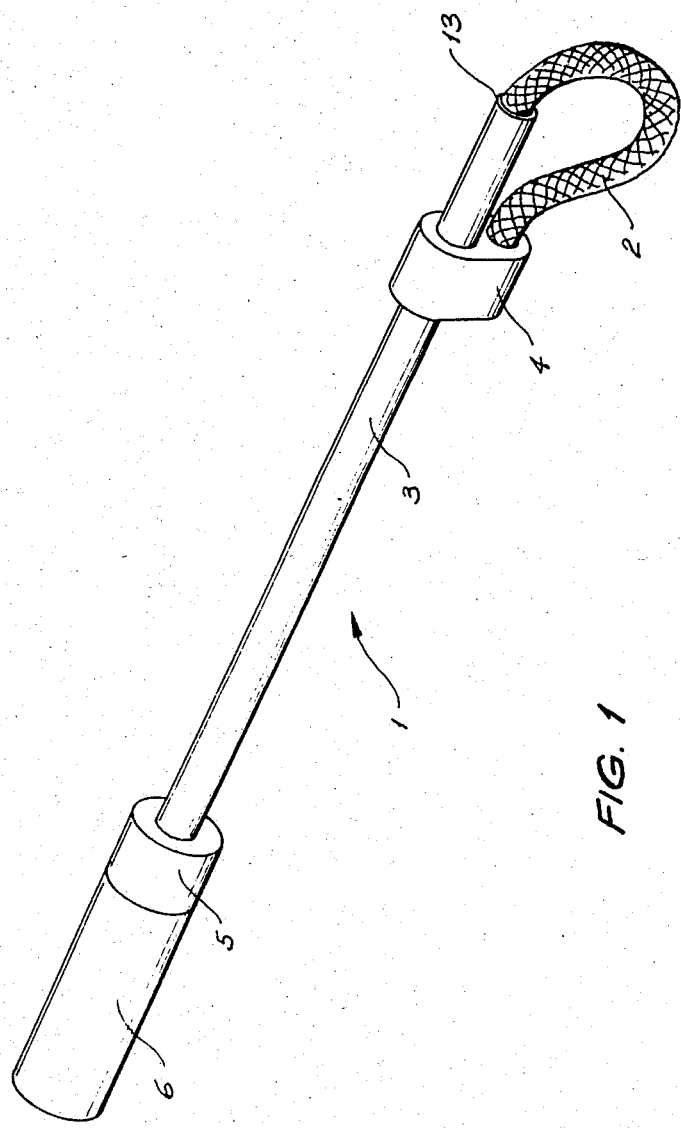
FIG. 1 is a perspective rear of a hand-held wick applicator according to the present invention.

Referring to FIG. 1, the hand-held rope-wick applicator 1 includes a rope-wick 2 secured to a tubular member 3 and a slide 4. The slide 4 allows the shape of the wick 2 to be varied in order to suit different situations of use. A screw top 5 is located at the end of the tubular member 3 remote from the wick 2. A deformable reservoir 6 screws into screw top 5.

Squeezing deformable reservoir 6 forces liquid 10 through tube 9 and into pressure chamber 7. Once liquid level rises above the bottom 11 of tube 9 the air 12 in pressure chamber 7 is compressed. On release of pressure from the reservoir 6, compressed air 12 expands forcing liquid 10 back up tube 9 away from wick 2. On manipulation of reservoir 6, negative pressure is achieved in pressure chamber 7 and liquid 10 is withdrawn from wick 2.

When the slide 4 is pushed close to the wick end 13 of tubular member 3, the applicator is most suitable for "spotting" i.e., applying herbicides to broad leaf weeds such as dandelion (Taraxacum officinale) in lawns, by dabbing the wick 2 on the crown of the weed.

When the wick 2 is extended by pushing the slide 4 away from end 13, the applicator can be used with a scything action on taller weeds.

Figure 2:
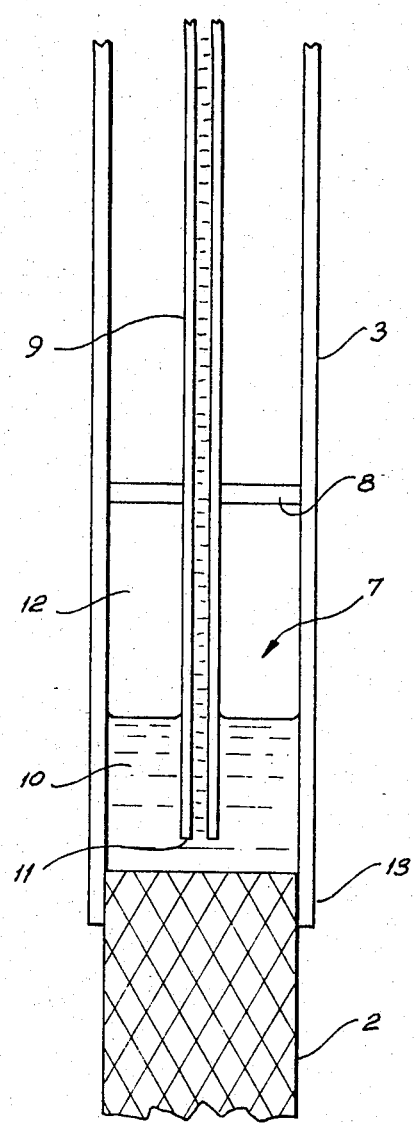
FIG. 2 is a cut away view of the lower portion of the applicator of FIG. 1, showing detail of the pressure chamber.

FIG. 2 shows pressure chamber 7 formed within tubular member 3 adjacent wick by membrane 8. Supply tube 9 is provided between pressure chamber 7 and screw top 5 (as in FIG. 1).

In the embodiment of FIGS. 1 and 2 the wick 2 is glued into place in the tubular member 3. Other methods of attachment known in the art such as staples, sleeves of heat shrinkable material, rubber grommets, screw pressure-caps, and the like, serve equally well. Supply tube 9 can be glued into place in membrane 8 or can be a tight pressure fit.

Most types of rope are useful as wicks 2 in the present invention. However, synthetic ropes such as DACRON (Registered Trademark), nylon or polypropylene are preferred. The rope-wick as disclosed in U.S. Pat. No. 4,328,640 is also suitable.

The materials used to construct the tubular member 3, membrane 8 and supply tube 9 can be any material which is compatible with herbicide solutions proposed to be used. Polyvinylchloride (PVC) has been found suitable.

Figure 3:
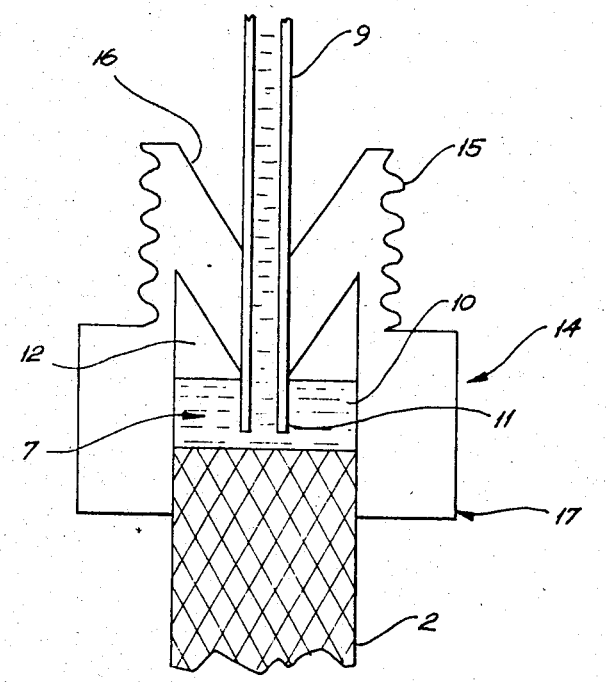
FIG. 3 is an alternative embodiment of the pressure chamber shown in FIG. 2 which can also be employed in large scale agricultural rope-wick applicators.
Figure 4:
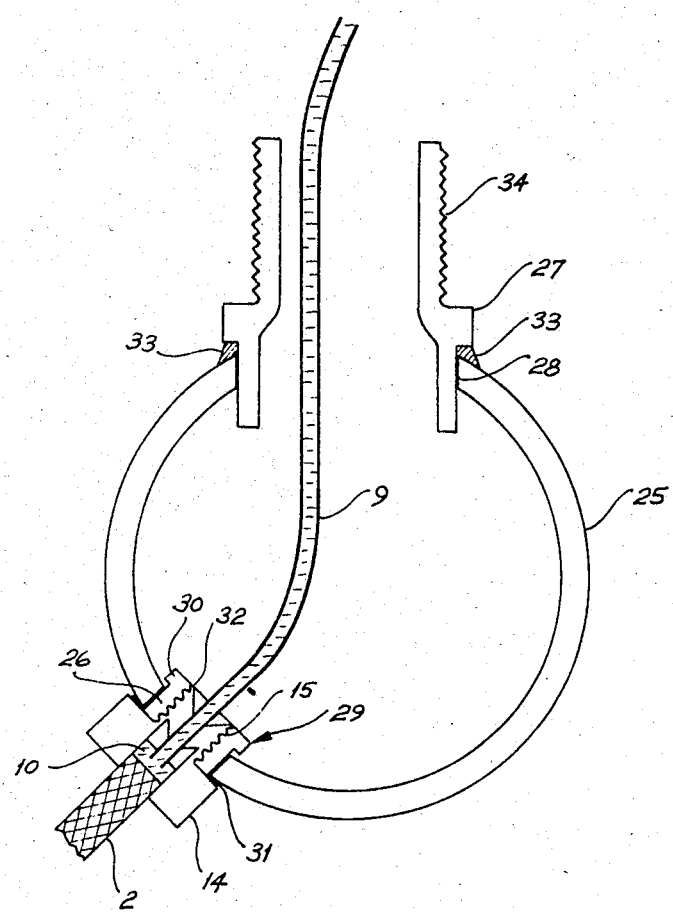
FIG. 4 is a section through an agricultural rope-wick applicator of the type generally described in Australian Patent Application No. 62043/80 or in U.S. Pat. Nos. 4,187,638 and 4,219,964 but which includes the embodiment of FIG. 3.
Figure 6:
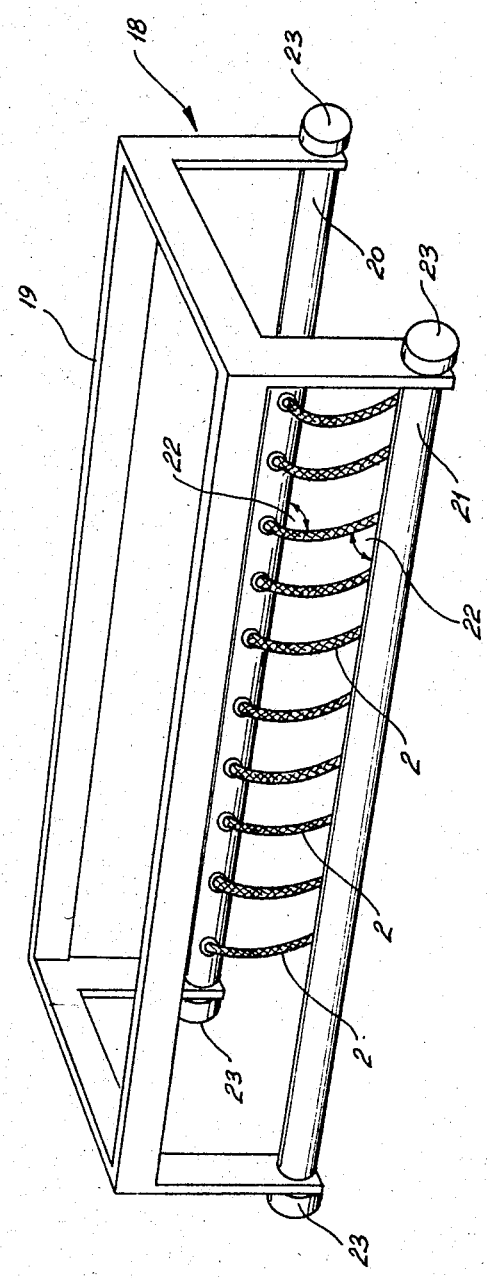
FIG. 6 is a perspective view of an agricultural rope-wick applicator of the type generally described in Australian Patent Application No. 62 043/80 but which includes the embodiments of the present invention shown in FIG. 3.
Figure 7:
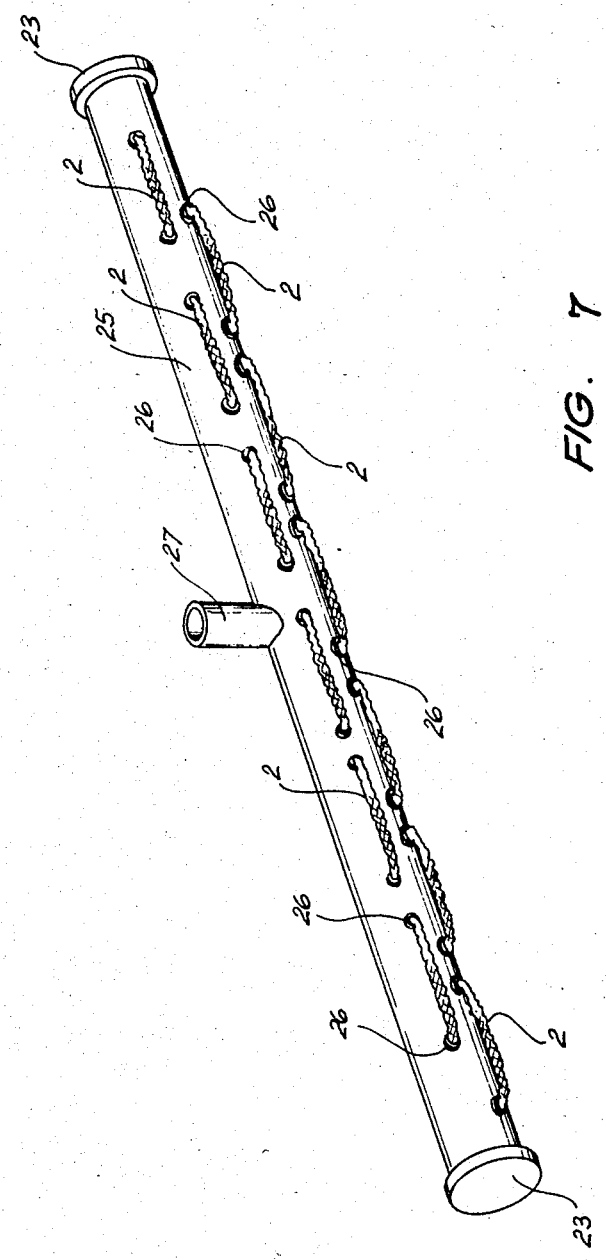
FIG. 7 is a perspective view of an agricultural rope-wick applicator of the type generally described in U.S. Pat. Nos. 4,187,638 and 4,219, 964 but which includes the embodiments of the present invention shown in FIG. 3.

FIG. 3 illustrates a moulded end 14 for a rope-wick 2 having a pressure chamber 7 and screw thread 15 to facilitate fitting rope-wicks to either hand-held applicators as in FIG. 1 or larger agricultural applicators such as those illustrated in FIGS. 4, 6 and 7. The top end 16 adjacent the screw thread is shaped for ease of insertion of the supply tube 9. The wick end 17 can be conveniently knurled or formed in hexagon shape to facilitate insertion and removal of the moulded end in/from a hand-held or agricultural applicator.

In FIG. 3 as in the embodiments of FIGS. 1 and 2, supply of liquid 10 under pressure past lower end 11 of supply tube 9, compresses air 12 in pressure chamber 7. Release of pressure on liquid 10 permits air 12 to expand and force liquid 10 back through supply tube 9 away from wick 2. Liquid 10 is removed from wick 2 as pressure is achieved in pressure chamber 7.

In FIG. 3 as in FIGS. 1 and 2, the wick 2 and supply tube 9 can be secured to the moulded end 14 by any suitable means.

FIG. 4 is a cross section through any one of booms 20, 21 and 25 (as illustrated in FIGS. 6 and 7). The description which follows relates to an embodiment such as that of FIG. 7 but is equally applicable to an embodiment such as that of FIG. 6. A boom 25 of circular cross section has openings 28 and 26 to accommodate a filling neck 27 and adaptor 29 respectively. A number of adaptors 29 are employed to accommodate a plurality of wicks 2, one or more filling necks can be used to suit various requirements. The adaptor 29 has flanges 30, 31 to seal opening 26 and screw thread 32 which corresponds with screw thread 15 of moulded end 14. The moulded end 14 which carries wick 2 and supply tube 9 is as described in FIG. 3. The filling neck 27 is secured in opening 28 by welds 33 and has a screw thread 34 to take one end of a protective cover (not shown) for the supply tubes 9.

In the embodiment of FIG. 4, it is convenient to supply liquid 10 from the reservoir (not shown) by a main supply tube (not shown) of larger diameter than supply tubes 9, to a sub-reservoir which supplies tubes 9.

Figure 5:
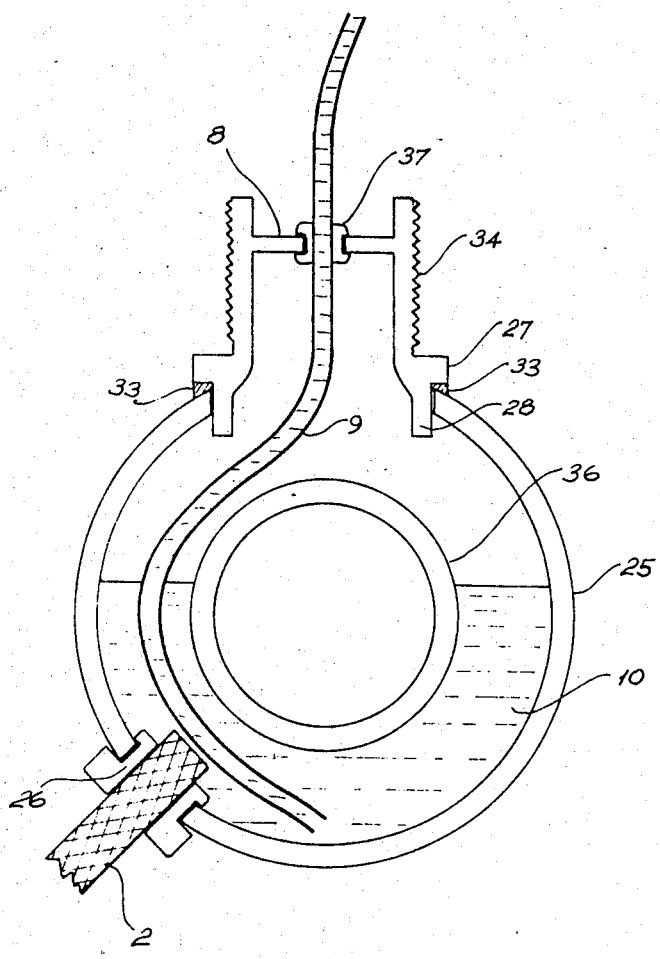
FIG. 5 is a section through an agricultural rope wick applicator of the type generally described in Australian Patent Application No. 62043/80 or in U.S. Pat. Nos. 4,187,638 and 4,219,964 but which includes the embodiment of FIG. 3 employing a different type of pressure chamber according to the invention.
Figure 8:
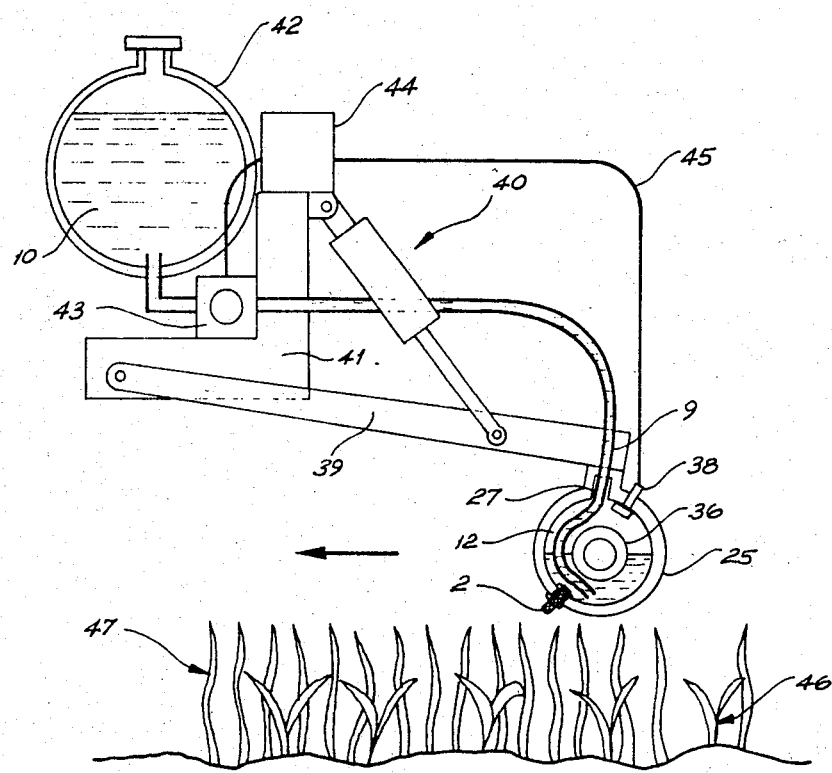
FIG. 8 is a schematic of an agricultural rope-wick applicator according to the invention.

FIG. 5 illustrates a further preferred embodiment as an alternative to FIG. 4 and which is adaptable to the applicators of FIGS. 6, 7 and 8. A boom 25 of circular cross section has openings 28 and 26 to accommodate filling neck 27 and grommet 37. As with the embodiment of FIG. 4, a number of grommets 37 are employed to hold a plurality of wicks 2 and one or more filling necks 27 can be used. A pipe 36 is affixed concentric within the boom 25 to reduce the volume of liquid 10 held within the boom. Filling neck 27 is secured by welds 33 and has screw thread 34 for securing a protective cover (not shown) for supply tubes 9 as described in FIG. 4. The supply tube 9 is secured within filling neck 27 by membrane 8 and grommet 37 so that the boom 25 functions as a pressure chamber such as is described with reference to FIGS. 2 and 3.

It should be noted that the embodiment of FIG. 5 tends to be cheaper to construct than that of FIG. 4. This is due to the use of a single supply line and a single pressure chamber.

FIG. 6 shows a double boom rope-wick applicator 18 having a frame 19, front boom 20 and rear boom 21. A series of generally parallel rope-wicks 2 are secured between the booms 20, 21, preferably at an angle 22 of between 30° and 60° to each boom. This ensures that the wicks 2 wipe along the weeds for longer contact time than with the embodiment of FIG. 7. Each boom 20, 21 has two end caps 23. The wicks 2 may be affixed and supplied with liquid as hereinbefore described in relation to FIGS. 4 and 5.

A single boom rope-wick applicator 24 is shown in FIG. 7. The boom 25 is provided with a series of wicks 2 parallel to the axis of the boom and emanating from openings 26. The boom 25 has end caps 23 and filling neck 27. The wicks 2 are affixed and supplied with liquid as described hereinbefore in FIGS. 4 and 5.

FIG. 8 illustrates a preferred agricultural embodiment of the present invention. The boom 25 is as described in FIG. 5 including filling neck 27, wicks 2, concentric pipe 36 and supply tube 9 and also has a pressure sensor 38. The boom 25 is mounted through a pivoted bar 39 and hydraulic lift assembly 40 on the frame 41 of a tractor (not shown).

The frame 41 also carries a reservoir 42 containing liquid herbicide 10, a pump 43 in supply tube 9 between the reservoir 42 and the boom 25. The pump 43 is actuated by control 44 which receives output of pressure sensor 38 via line 45. The control 44 is also associated with a sensor (not shown) which detects movement of the tractor. In use the boom 25 is drawn by the tractor.

In use the boom 25 is drawn by the tractor across the paddock with its axis transverse to the rows of crop. The hydraulic lift assembly 40 enables the elevation of the boom 25 to be set slightly above the level of the crop plants 46 but below the level of the weeds 47 so that the herbicide liquid 10 is applied by wicks 2 to the portions of the weeds which grow above the level of the crops. The control 44 can be set such that the pump 43 will operate to maintain the pressure within the pressure chamber (boom 25) between preselected upper and lower limits. It is preferred that the pump 43 be a reversible type so that when the tractor stops, the pressure in the supply tube can be reduced so that the compressed air 12 with the aid of the pump 43 operating in reverse forces herbicide liquid 10 out of the boom 25 to minimise drip from the wicks 2. On further operation of the pump 43 in reverse, herbicide liquid is sucked back from the wicks 2 into the boom 25. Alternatively, supply tube 9 can be fitted with a pressure release valve which is actuated by the control 44 when the tractor stops. In this case provision for return of overflow liquid to the reservoir 42 should be made.

In embodiments of the invention where the moulded ends of FIG. 3 are fitted to booms, a portion of the moulded ends may be fitted with pressure sensors in their pressure chambers and the control adapted to read and act upon a mean pressure in the pressure chambers.

It is especially preferred that supply of liquid herbicide can be separately controlled to sections of the boom so that the operator can adjust herbicide supply to suit varying weed configurations in pasture or row crop situations.

The control 44 preferably includes a provision such that the operator can over-ride the settings thereon so that when treating paddocks where weed distribution is variable, supply of herbicide can be increased where weeds grow thickly or in clumps, or can be reduced by reversing pump 43 when passing over weed-free tracts of land.

Any herbicide which acts by contact with foliage and translocates throughout the plant can be used with the applicators and method of the present invention.

Glyphosate (N-(phosphonomethyl) glycine) which is sold under the registered trade marks ZERO and ROUNDUP is a systemic herbicide which is capable of controlling most broad leaf and grass weeds and is most suitable for use with the applicators and method of the present invention.

Dicamba (3,6-dichloro-o-anisic acid) sold under the registered trade mark BANVEL is also most suitable for use in conjunction in the present invention.

What I claim is:

1. An apparatus for applying a liquid to plants, said apparatus comprising a pressure chamber having substantially inextensible walls which permit the interior pressure of said pressure chamber to be greater than atmospheric pressure; wick means extending from apparatus to apply said liquid to plants, a portion of said wick means being exposed to the atmosphere and one end of said wick means communicating with said pressure chamber via a first sealed connection; a reservoir containing said liquid; a supply tube in fluid communication with said reservoir, one end of said supply tube passing into said pressure chamber via a second sealed connection; and pressure means connected with said reservoir and supply tube to selectively increase or decrease the pressure of said liquid in said reservoir relative to atmospheric pressure thereby respectively passing liquid from said reservoir through said supply tube and into said pressure chamber to raise the interior pressure thereof by the occluding of said supply tube one end to wet said wick means by forcing said liquid into said wick means, or withdrawing liquid from said supply tube, pressure chamber and wick means into said reservoir.

2. Apparatus as defined in claim 1 wherein said reservoir has manually deformable side walls which constitute said pressure means.

3. Apparatus as claimed in claim 1 wherein said pressure chamber is formed within a hollow body shaped to be releasably engaged with a side wall of said reservoir.

4. Apparatus as defined in claim 1, wherein said supply tube is formed within an elongate tubular member having attachment and support means for said reservoir at one end, and both said pressure chamber and said wick means at the other end.

5. Apparatus as defined in claim 4 having a partition with the same cross-sectional shape as the interior of said tubular member and which extends thereacross to define an end wall of said pressure chamber through which said one end of said supply tube passes.

6. Apparatus as claimed in claim 4 wherein said wick means comprises an elongate wick having a free end which is attached to a slide means mounted for movement along said tublar member, said wick with said slide member positioned closest to said other end of said tublar member being curved outwardly away from said other end of said tublar member, and said wick with said slide member positioned closest to said one end of said tubular member laying alongside said tubular member.

7. Apparatus as defined in claim 1 wherein said pressure chamber is associated with a pressure sensing means to sense the pressure therein; control means associated with said pressure means and with said pressure sensing means, said control means being for maintaining the pressure in said pressure chamber between predetermined limits whilst said apparatus is in operation and said control means further being for reducing pressure from said reservoir on cessation of operation so that the pressure in said pressure chamber forces said liquid back along said supply line towards said reservoir and away from said wick means and so that when pressure in said reservoir is less than atmospheric pressure, liquid is withdrawn from said wick means along said supply line.

8. Apparatus as defined in claim 7, wherein a plurality of wick means are mounted on a framework; at least one supply line connects said reservoir with said plurality of wick means and at least one pressure chamber is in communication with said plurality of wick means.

9. An apparatus as defined in claim 8, wherein said framework comprises at least one pair of elongated parallel booms, having a plurality of said wick means mounted between each pair of parallel booms.

10. An apparatus as defined in claim 9, wherein said wick means are mounted between said parallel booms at angles ranging between 30° to 60° with respect to a longitudinal axis of said booms.

11. In an apparatus for applying a liquid to plants comprising: a reservoir containing said liquid; wick means for applying said liquid to plants; supply line connecting said reservoir with said wick means for supply of said liquid to said wick means; the improvement wherein said supply line includes a pressure chamber intermediate said reservoir and said wick means and in communication with said wick means; and said apparatus includes pressure sensing means associated with said pressure chamber to sense the pressure therein; variable pressure means operative to force said liquid from said reservoir and into said pressure chamber thereby pressurizing said pressure chamber and wetting said wick means with said liquid; said variable pressure means further operative to reduce pressure in said reservoir; control means associated with said pressure means and with said pressure sensing means, said control means being for maintaining the pressure in said pressure chamber between predetermined limits whilst said apparatus is in operation and further being for reducing pressure from said reservoir on cessation of operation such that the pressure in said pressure chamber forces said liquid back along said supply line towards said reservoir and away from said wick means and such that when pressure in said reservoir is less than ambient pressure, liquid is withdrawn from said wick means along said supply line.

12. In an apparatus for applying a liquid to plants comprising: a reservoir containing said liquid; a plurality of wick means for applying said liquid to plants; a framework to mount said plurality of wick means; at least one supply line connecting said reservoir with said plurality of wick means, the improvement wherein at least one pressure chamber is in communication with said plurality of wick means and intermediate said wick means and said reservoir, reversible pressure means to force said liquid from said reservoir and into said pressure chamber thereby pressurizing said pressure chamber and wetting said plurality of wick means with said liquid; pressure sensing means associated with said pressure chamber to sense the pressure therein; control means associated with said reversible pressure means and with said pressure sensing means adapted to maintain the pressure in said pressure chamber between predetermined limits whilst said apparatus is in operation and to reverse pressure from said reservoir on cessation of operation such that the pressure in said pressure chamber coupled with the reversal of pressure supplied by said reversible pressure means forces said liquid back along said supply line towards said reservoir and away from said wick means.

13. An apparatus as defined in claim 12, wherein said framework is at least one elongated boom, having a transverse longitudinal axis, said boom having a plurality of wick means mounted parallel to said transverse longitudinal axis, wherein both ends of said wick means have communication with the interior of said boom.

14. An apparatus as defined in claim 13, wherein said boom embodies said pressure chamber.

15. An apparatus as defined in claim 13 wherein each said wick means has associated therewith at least one of said pressure chamber.

16. An apparatus as defined in claim 12, wherein said framework comprises at least one pair of elongated parallel booms, having a plurality of said wick means communicating the booms of each pair of parallel booms.

17. An apparatus as defined in claim 16, wherein said wick means are mounted between said parallel booms at angles ranging between 30° to 60° to longitudinal axes of said booms.

18. An apparatus as defined in claim 16 or claim 17, wherein at least one of said booms embody said pressure chamber.

19. An apparatus as defined in claim 16 or claim 17 wherein each said wick means has associated therewith at least one of said pressure chamber.

* * * * *